May 20, 1952 K. B. BLODGETT 2,597,562

ELECTRICALLY CONDUCTING LAYER

Original Filed Jan. 29, 1947 2 SHEETS—SHEET 1

Inventor:
Katharine B. Blodgett,
by Richard E. Hosley
His Attorney.

ELECTRICALLY CONDUCTING LAYER

Inventor:
Katharine B. Blodgett,
by Richard E. Hosley
His Attorney.

Patented May 20, 1952 2,597,562

UNITED STATES PATENT OFFICE 2,597,562

ELECTRICALLY CONDUCTING LAYER

Katharine B. Blodgett, Schenectady, N. Y., assignor to General Electric Company, a corporation of New York Continuation of abandoned application Serial No. 724,961, January 29, 1947. This application March 30, 1949, Serial No. 84,466

16 Claims. (Cl. 201—73)

Figure 2:
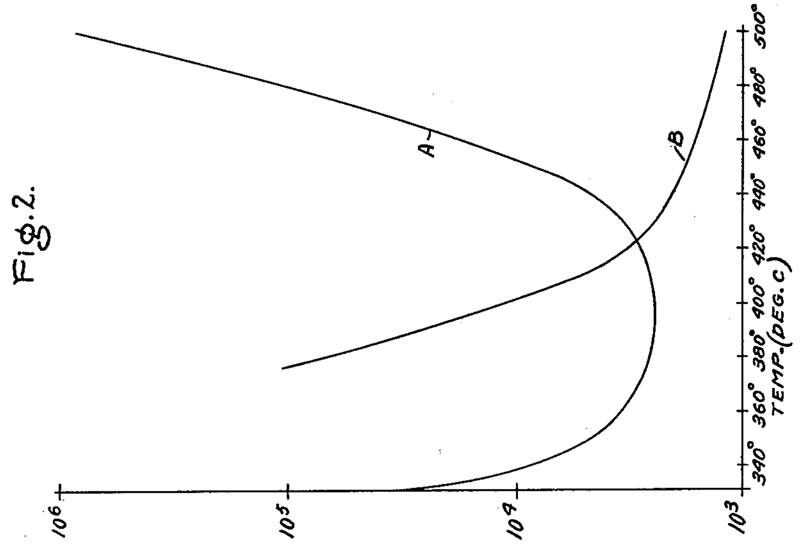

My invention relates to electrical resistors, electrical insulators, electrical discharge devices, and other devices upon which for various reasons a conducting layer of predetermined high resistivity is desired.

This application is a continuation of my copending patent application, Serial No. 724,961, filed January 29, 1947, now abandoned.

In applications wherein high voltages are employed, electrically conducting layers having high resistivities and exhibiting stable characteristics are of great value. For example, a conducting layer of high resistivity which will not break down at very high voltage stresses may be utilized as a resistive element between the grid and cathode of a discharge device, thereby permitting the successful employment of very high control voltages. In high voltage discharge devices having insulating envelopes enclosing spaced operating electrodes, a conducting layer of high resistivity may be applied to the surface of the envelope to dissipate the electrical charges which tend to collect thereon and to distribute evenly the potential gradient between the electrodes, thereby permitting the utilization of very high operating voltages with smaller electrode spacings. In a like manner, such conducting layers may be applied to high voltage transformer bushings and transmission line insulators to reduce permissible line to ground and interline spacings without increasing arcing possibilities.

It has been proposed heretofore to increase conductivity, or reduce the resistivity, of glassy materials by the application of highly conducting substances such as metals to the surfaces or into the bodies of glasses. In such a manner, electronic conduction rather than ionic is obtained and, subsequently, the polarization inherently accompanying the latter is avoided. Surface treatments for obtaining highly conductive layers have included metallizing procedures wherein salts of such metals as platinum, gold or copper are heated to a reduction on the glass, as well as many other methods involving chemical treatments. In all these procedures, however, control of the conductivity of the applied layer has not been feasible since the insulating nature of the oxide surface predominates until sufficient metal has been applied to give the surface the high conductivity of the metal itself. This, of course, dictates that the surface will be insulating so long as the metal particles are not in contact and when they are, conduction will be in the metal layer and will depend solely on its properties. Thus, it has not been possible by such procedures to obtain articles having predictable, high surface resistivity.

My invention has for its general object the production of articles having conducting surface layers which exhibit high resistivities. It is another object of my invention to provide articles which have conducting surface layers, the resistivity of which may be controlled and predictably produced within desired values. It is a further object of my invention to produce articles having conducting surface layers which exhibit ohmic characteristics and are stable even under very high voltage stresses.

According to one important feature of my invention, I may produce the aforesaid conducting layers upon glass articles having lead oxide as a constituent material by the simple expedient of heating specimens of such glass in a reducing atmosphere at certain specified temperatures. To increase the predictability of the resistivity of the conducting layers, I form a thin silica film on the surface of the specimens before the heat treatment.

According to another important feature of my invention, I may produce conducting surface layers upon composite articles comprising a suitable foundation and a coating or coatings of glass containing lead oxide as a constituent material.

Figure 3:
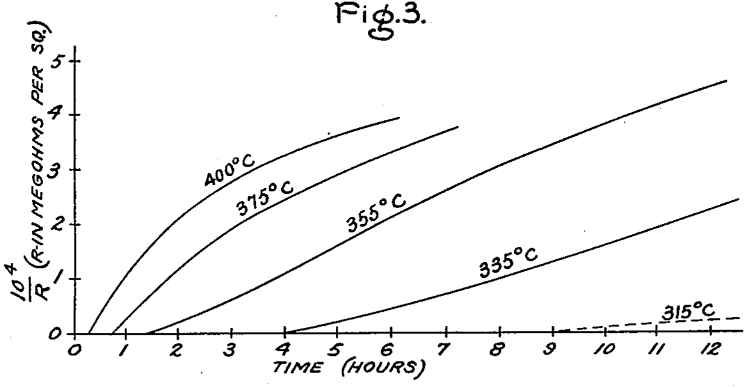
Figure 4:
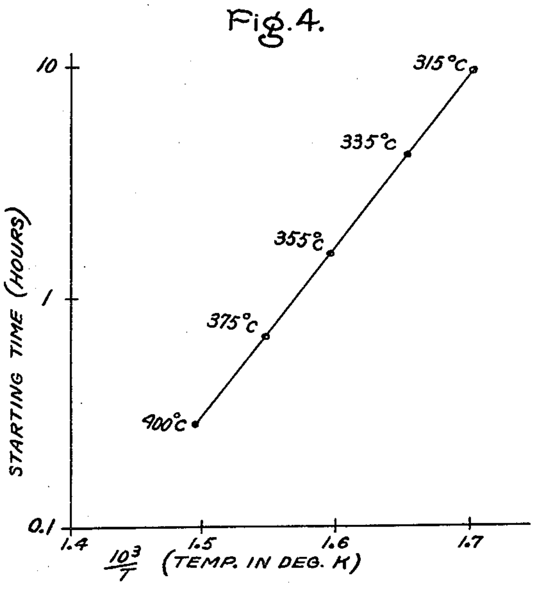
Figure 5:
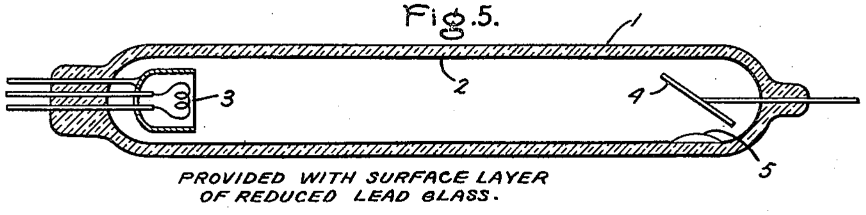

Other objects, advantages and features of my invention will be apparent from the following description taken in connection with the accompanying drawings in which Figs. 1, 2, 3 and 4 are graphs useful in describing my invention and Fig. 5 is a conventionalized representation of a high voltage discharge device illustrative of devices upon which my electrically conducting layers may be advantageously applied.

According to a first important feature of my invention, I select a suitable glass of high lead oxide content upon which a conducting layer is to be produced. I have found that the lead glass commonly used in X-ray apparatus for shielding purposes and referred to as "X-ray shield glass" possesses a composition which is suitable for employing my invention. This glass ordinarily is formed from about 61% lead oxide, 8% barium oxide and 31% silica by weight. I have found that higher contents of lead oxide accompanied by correspondingly lower contents of silica may be advantageously employed for certain purposes but the lower limit of the lead oxide content is about 60%, as will appear hereinafter.

After selecting a suitable specimen of the shield glass, which may be of any size and shape according to the purpose for which it will be subsequently used, I form a thin film of silica on the surface thereof. One convenient way of obtaining this surface film comprises treating the specimen in a dilute solvent for lead oxide such as 0.01 HCl at a temperature of 25 to 60° C. In this manner, lead oxide may be leached out of the glass specimen to a depth which is determined by the strength and temperature of the acid and the length of time of treatment. The rate of leaching increases rapidly with solvent temperature and a film of approximately 1,000 A. U. thickness may be obtained in about three minutes when the solvent temperature is approximately 35° C. This film may also be obtained by evaporating lead oxide from the surface of the specimen, but in such event care must be taken to avoid exceeding the melting point of the specimen.

After forming the aforesaid silica film, I next heat the specimen in a reducing gas such as hydrogen at predetermined temperatures for specified lengths of time. Since the silica film is porous, the hot hydrogen will readily penetrate the film and reduce the lead oxide in the specimen to form a surface layer beneath the silica film. Providing this treatment in hydrogen is carried out in a proper manner as described hereinafter, the reduced layer will have a desired predictable high resistivity.

Figure 1:
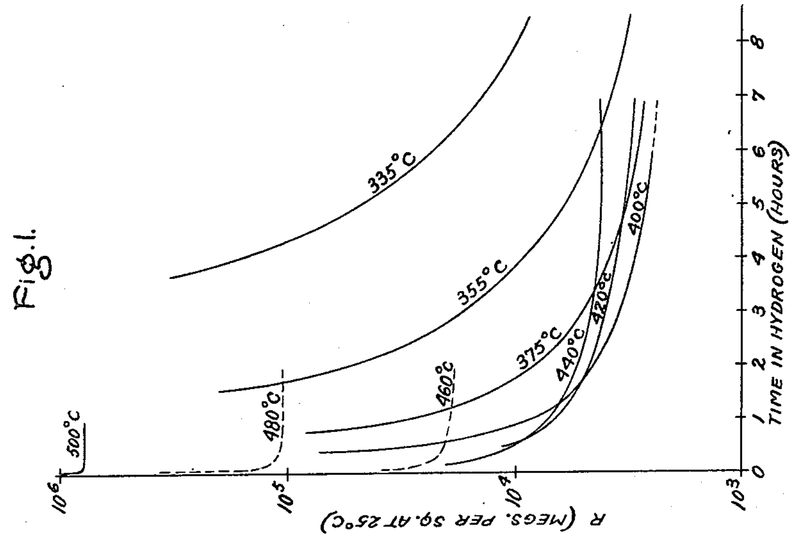

Fig. 1 shows the time of treatment of specimens of shield glass in hydrogen plotted as abscissae on a linear scale vs. the resistivity in megohms per square plotted as ordinates on a logarithmic scale, the resistivity being converted to 25° C. Each curve represents the change in resistivity of a given specimen as it is heated in hydrogen at the constant temperature with which the curve is labeled. It will be noted that in each case the surface resistivity of the specimen decreases from an initial, approximately infinite, value fairly rapidly at first and then more slowly to approach asymptotically a lower limiting value. The curve for 480° C. reaches a lower limiting value of about $1.1\times10^5$ megohms per square very quickly, and this value will not vary appreciably, no matter how long the time of treatment is extended. Treatment at 500° C. will impart some surface conductivity (the inverse of resistivity) to a specimen, the lower limiting value being about $8\times10^5$ megohms per square. However, if a specimen is heated at 520° C., no appreciable conductivity will be imparted to a specimen at all. The curve for 335° C. has not yet reached its lower limiting value after 8 hours' treatment, but extension of the treatment time shows that such a lower limiting value will be reached. Extrapolation of the curves between 375° C. and 400° C. shows that the lowest limiting value of resistivity will be reached within this range of temperature.

Although the theoretical description of this phenomenon is not fully understood, I have evolved the following explanation based upon a nucleation theory. In processes where nuclei occur, it is commonly observed that large numbers of very small nuclei form in the low temperature region of the range in which they appear. A smaller number of much larger nuclei are formed in the high temperature region of the range. After the nuclei have been once formed, they do not migrate.

In the above described treatment of lead glass specimens, therefore, it may be assumed that within the low temperature region of the range in which nuclei appear, say from 315° C. to 400° C., a large number of very small nuclei are formed. As the treatment is extended, these nuclei grow to become very small spheres which eventually touch each other to form connecting chains. When the first connecting chains are formed, the specimen begins to obtain conductivity. Further extension of the hydrogen treatment increases the number of chains and hence increases the conductivity, or decreases the resistivity.

In the high temperature region of the range in which the nuclei appear, say from 400° C. to 500° C., a much smaller number of relatively large nuclei are formed. Extension of the treatment time in this event will cause the nuclei to form spheres as before, but a relatively few number of chains will be formed because the spheres remain isolated to a greater extent.

In the low temperature region where a great number of nuclei are formed, the decrease of resistivity to approach asymptotically a lower limiting value is apparently caused by the increase in thickness of the conductive layer as the treatment time is extended. The hydrogen will not penetrate the thicker conductive layer too readily to reach the surface of the specimen and further reduce the lead oxide therein. Therefore, the rate at which additional chains are formed decreases as the treatment time increases and an approximately constant lower value of resistivity is ultimately reached. In the upper region, however, the lower limiting value of resistivity would seem to be caused by the fact that only a small number of chains can be formed between the relatively large nuclei, and these are soon established. Subsequent extension of the treatment time, therefore, will not decrease the resistivity.

Curve A in Fig. 2 shows the end values of resistivity for each one of the curves in Fig. 1 after 7 hours' treatment in hydrogen. It is to be observed that the lowest value of resistivity after 7 hours' treatment occurs at approximately 400° C. Extension of the treatment time beyond 7 hours indicates that the lowest value of resistivity will occur between approximately 370° C. and 400° C. for the X-ray shield glass. Apparently, the reason for this is that the hydrogen will not penetrate the conductive layer to as great a depth at the lower temperatures and, therefore, even though greater numbers of nuclei are formed at the lower temperatures, the lower limiting value of resistivity will be higher. Above 400° C. the lower limiting value of resistivity will be determined by the number of nuclei formed rather than by the depth to which the hydrogen can penetrate the conductive layer. Therefore, between 370° C. and 400° C. the combination of the two factors, i. e., the depth to which the hydrogen will penetrate the conductive layer and the number of nuclei formed, results in the lowest limiting value of resistivity.

As is indicated by Fig. 1, the time at which conductivity is first imparted to the specimen increases as the treatment temperature is decreased. Fig. 3 shows this more clearly. Therein, the inverse of the resistivity or conductivity, from the various curves in Fig. 1 is plotted along a linear ordinate scale against the time of treatment on a linear abscissa scale. The curve for 315° C. does not appear on Fig. 1. It will be observed that the time at which conductivity first appears, or the "starting time" where the curves strike the X-axis, varies from less than one-half hour at 400° C. to more than nine hours at 315° C. These starting times provide a convenient measure of the time at which the nuclei population is established because by the time conductivity first appears, the number of nuclei must have been established and the first conducting chains formed. Fig. 4 shows that these starting times all fall approximately on a straight line when plotted on a logarithmic scale against the inverse of the treatment temperature in degrees Kelvin on a linear scale. Obviously, the length of time required to reach the starting time at temperatures below about 300° C. to 315° C. is so long that little practical advantage can result from using temperatures below about 300° C.

As stated hereinbefore, the number of nuclei formed will be much greater in the low temperature region than in the high temperature region, and therefore, more chains can be formed with the final limitation of the depth to which the hydrogen can penetrate the conductive layer at the particular treatment temperature. However, in the high temperature region, the chains will be formed much more quickly. Consequently, if the number of nuclei is established within the low temperature region and the treatment temperature is then raised to a high value such as 500 or 520° C., a maximum number of conductive chains may be formed within a minimum length of time. This "two temperature" treatment may be advantageously employed to obtain lower final values of resistivity, as well as to realize a substantial saving in time. Fig. 3 shows the various lengths of time at which a specimen must be heated at various temperatures to exceed the starting time. After the starting time has been reached or exceeded, the temperature may then be raised to a higher value.

I have also found it convenient to obtain a conductive layer by inserting a specimen into the hydrogen atmosphere at a low temperature which may be about 300° C., and then to increase the temperature at a constant or known rate to a high value not exceeding 520° C. As may be realized from the above description, if the temperature is raised at a rate such that the integrated time spent in the low temperature region will cause the nuclei to be fixed in this region, then a final low value of resistivity may be obtained. I have found that a rate of 2° C./minute provides good results, although much slower rates may obviously be employed. In a like manner, somewhat faster rates may be utilized, but the integrated times must be such that the nuclei are fixed in the low temperature region in order to obtain a final low value of resistivity. Curve B in Fig. 2 is a plot of resistivity after treatment of shield glass specimens in hydrogen at temperatures from 320° C. to T °C. with the temperature rising at a rate of 2° C./minute, T °C. being the temperature shown in the abscissa. After the temperature of T °C. is reached, the specimens may be maintained at T °C. for a given time such as 30 minutes in order to provide results capable of easy duplication. Obviously, the time spent at T °C. may be varied as desired since the nuclei have already been fixed, and subsequent extension of treatment time will only serve to add chains.

The conducting layers formed upon specimens of shield glass in this manner are ordinarily about 100–200 A. U. in thickness. I have found such layers to be very stable under high voltage stresses and to exhibit ohmic characteristics. A resistive element produced according to my invention will have a linear current-voltage characteristic at gradients up to 100 kilovolts per inch, providing resistivity is such as to keep the energy dissipation below about 0.3 watt per square inch. In order to form electrodes upon a specimen to provide a resistive element, each end may be dipped into about a 5% solution of polyvinyl acetate in acetone, such solution containing flake graphite. This is done after the silica film has been applied but before the hydrogen treatment. Since the silica film is relatively porous, it has low electrical resistance.

It is not essential for imparting conductivity to the shield glass that the silica film be formed on the surface thereof as hereinbefore described. I prefer to utilize a silica film, because in this manner I am able to secure highly predictable results, and the curves shown in Fig. 1 may be easily duplicated within narrow limits, providing the composition of the specimens remains substantially the same. I have found that, if a specimen remains in air for some time, a very thin uneven film of silica is formed on its surface, presumably as a result of acidic vapors in the atmosphere. This film will not prevent the formation of my conductive layers, of course, but it will cause the obtained resistivities to vary considerably from specimen to specimen. Therefore, if a silica film of known thickness, or at least of even thickness, is formed on the surface of the shield glass prior to the hydrogen treatment, the resistivities obtained will be uniform. The silica layer may have a convenient thickness such as 150–5,000 A. U. I prefer to use a thickness of about 1,000 A. U. because such a thickness reflects an easily recognized blue interference color. A silica film which is formed by leaching lead from the surface of the specimen in a suitable solvent will at first be soft, but after the specimen has been heated at from 400 to 500° C. in air or hydrogen, it will become very hard, thereby serving additionally as a protective agent for the conductive layer formed underneath.

In order to further assure uniform resistivities in my conductive layers, I have found that annealing the specimen to remove possible strains may be advantageous. Also, the lower limiting value of resistivity, which is obtained after hydrogen treatment, may be decreased somewhat if the surfaces of the specimens are ground with a wet carborundum wheel prior to the application of the silica film. Apparently, this increases the exposed surface area which the hydrogen may reach, thereby aiding the formation of nuclei.

For some purposes the physical properties of lead glass may not be well situated for the fabrication of devices upon which a surface modified by reduction is desired. Therefore, in accordance with another important feature of my invention, I apply a coating or coatings of lead glass upon a selected foundation and by subsequent reduction, secure a composite article having a high, stable surface resistivity.

In accordance with this feature of my invention, I also select a glass having lead oxide as a constituent material, e. g. X-ray shield glass. As a first step, I comminute and finely powder the shield glass, for example, to about an 80-mesh size. Thereupon, I apply the finely divided glass as a thin coating on the surface of a foundation glass such as borosilicate glass, soda lime glass, lead glass with a lower lead oxide content, or a suitable ceramic material. I have found borosilicate glass to be particularly suited as a foundation material for use with high voltage electron discharge devices and therefore, the following description will be concerned principally with such a glass as a foundation, even though other materials may be employed with suitable efficacy.

In applying the powdered glass to the foundation, I have found it convenient to suspend the powdered glass in a suitable liquid medium, e. g. a solution of nitrocellulose in amyl acetate or other vaporizable medium. This mixture may be applied as a thin coating on the surface of suitable specimen of borosilicate foundation glass as by flowing, dipping or spraying. A coating of about 0.5 mil thickness is satisfactory. After the foundation glass has been thus coated, it is heated, preferably in air, for about a half hour at a temperature at which the coating will vitrify and form a tight bond with the underlying glass, 630° for the borosilicate glass. After the article has cooled, the powdered glass coat will have the appearance of a shiny glaze and cannot be loosened from the foundation glass by the test of applying gummed tape against the coating and pulling it off suddenly. Following the application and vitrification of the first coating, a second coating of the same powdered glass may be applied in identical fashion to the first. The heat treatment of this second coating, however, must be conducted at a somewhat lower temperature, say approximately 570° C. when X-ray shield glass is used as coating material. This temperature is high enough to make the second coating adhere to the first but low enough to prevent the second coating from being substantially incorporated by fusion into the first. Therefore, the second coating can be considered as being sintered. It has a mat appearance after cooling as contrasted with the glaze on the first coating. The thickness of the second coating should also be about 0.5 mil. Following the application and heating of the second coating, a silica film is formed thereon in the manner above described to insure predictable results.

To impart conductivity to the coated article so produced, it is baked in the presence of a reducing gas, such as hydrogen, at temperatures corresponding to those employed in connection with the X-ray shield glass described hereinbefore. As has been explained, these reducing temperatures are of critical importance, and the requirements mentioned with regard to temperature and time of treatment must be observed to secure effectively predictable results.

It is to be noted that the temperature at which the second coating is heated in air before the hydrogen treatment should not be much above 570° C. If this coating is heated at temperatures ranging from 600 to 630° C., the resulting resistivity after hydrogen treatment is not readily predictable. The limits of this temperature are therefore determined on the one hand by the fact that the second coating must adhere to the first and on the other hand by the fact that the predictability of the resistance must not be destroyed. In many cases, it is advantageous that the first coating should have substantially no conductivity after hydrogen treatment and, consequently, it is desirable to heat the first coating at as high a temperature as does not exceed the melting point of the underlying foundation. As will be explained hereinafter, the coating compositions may be varied within certain ranges, and in such event, the temperatures at which the coatings are heated may be advisedly varied to achieve the above purposes.

In the foregoing description I have mentioned several alternatives for the foundation material upon which coatings may be applied. The foundation material, of course, should have a substantially infinite electronic resistance as well as a suitably high resistance to ionic conduction. I have found that the ceramic material, such as porcelain, may be advantageously employed as a foundation for my coatings. The coatings may be applied to porcelain in a manner similar to that described above in connection with borosilicate glass. It may be desirable, however, to heat the first coating in air at a temperature of about 670° C. rather than 630° C., in order to cause the coating to adhere more securely to the porcelain.

While I have described in particular the application of two coatings upon a suitable foundation material, and the subsequent reduction in a reducing atmosphere to produce surface conductivity upon the outer coating, it may be desirable for some applications to apply only one coating to a foundation material. In such event, the foundation material must be such that the coating may be caused to adhere thereto without exceeding the temperature ranges above stated in connection with the application of the second coating. I have found that one coating may be applied to porcelain with suitable results, but I prefer to employ two coatings in order to enhance adherence to the porcelain. Therefore, while I deem it to be within the scope of my invention to apply only one coating, I find that the application of two coatings will secure more predictable and reliable results with porcelain as a foundation.

In making a resistive element from such coated articles, electrodes may be formed by painting a band of silver paint upon the first coating at both ends of the specimen. Thereafter, the second coating may be applied as hereinbefore described, and the conductive layer developed by hydrogen treatment. It is inadvisable to place the silver paint upon the second coating because the oil from the paint will be absorbed by the second coating and reduce the area upon which a conductive layer may be developed.

In Fig. 5 there is shown an electron discharge device illustrative of further application of my invention. Such an electron discharge device may be employed for the generation of X-rays or for any applications requiring the use of an electronic or ionic discharge by high applied voltages. The glass envelope 1, which may be evacuated and consist of a suitable borosilicate glass, is coated either inside or outside or both inside and outside in the manner above described. Commonly, the inner surface of the envelope is coated with two superimposed coatings of shield glass. The window 5 may be left uncoated for the passage of X-rays to the exterior. The coatings 2 may each have a thickness of about 0.005''. The reduction of the shield glass as described results in a conductive layer having a desired predetermined resistivity which is suitable for equalizing the distribution of charges which tend to accumulate on the glass envelope, as well as for distributing evenly the potential gradient which exists between the cathode 3 and the anode 4 when the device is in operation. An application, Serial No. 725,089, filed concurrently herewith by Ernest E. Charlton and now abandoned, describes and claims electronic devices in which are incorporated coatings having a conductive surface layer prepared in accordance with the present invention.

While the above description has been concerned with X-ray shield glass having approximately the stated composition, I have found that higher contents of lead oxide, e. g. up to 85% by weight, may be advantageously employed for the production of my conductive layers. As the lead oxide content is increased, the curves in Fig. 1 will be shifted correspondingly with the lowest limiting value of resistivity occurring within a lower temperature range than 375° C. to 400° C. If the lead oxide content is decreased below about 60% by weight, predictable resistivities cannot be obtained. I therefore prefer to employ compositions which have a lead oxide content ranging between 60% and 85%.

What I claim as new and desire to secure by Letters Patent of the United States is:

1. The method of imparting a predictable high surface resistivity to lead glass which comprises forming a thin surface film of silica on a specimen of lead glass having a lead oxide content of at least 60% by weight, and heating said specimen in a reducing atmosphere at a substantially constant temperature selected from the range of about 300° C. to 500° C. for a time correlated with the selected temperature.

2. The method of imparting a predictable high surface resistivity to lead glass which comprises forming a thin surface film of silica on a specimen of lead glass having a lead oxide content of at least 60% by weight, and heating said specimen in a reducing atmosphere at a rising temperature having a known rate of rise to produce a conductive layer beneath said film, the upper limit of said temperature being about 520° C. and the rate of rise not exceeding a value at which measurable surface conductivity will be imparted to said specimen at a temperature below about 400° C.

3. The method of imparting a high surface resistivity to lead glass which comprises heating a specimen of lead glass having a lead oxide content of at least 60% by weight in a reducing atmosphere first at a temperature between about 300° C. and 400° C. until a measurably conductive layer is produced upon the surface of said specimen and then raising the temperature above about 400° C. but not exceeding about 520° C. to impart further conductivity to said layer.

4. The method of imparting a high surface resistivity to lead glass which comprises forming a thin surface film of silica on a specimen of lead glass having a lead oxide content of at least 60% by weight, and heating said specimen in a reducing atmosphere first at a temperature between about 300° C. and 400° C. until a measurably conductive layer is produced upon the surface of said specimen beneath said film and then at a temperature above about 400° C. but not exceeding about 520° C. to impart further conductivity to said layer.

5. The method of fabricating a high resistance conductor which comprises applying to a foundation of insulating material at least one coating of lead glass having a lead oxide content of at least 60% by weight to produce a composite article, forming a thin silica film on the outer surface of said coated composite article, and heating said article in a reducing atmosphere at a substantially constant temperature selected from the range of about 300° C. to 500° C. for a predetermined time correlated with the selected temperature to form a conductive layer on the surface of said article beneath said film.

6. The method of fabricating a high resistance conductor which comprises applying to a foundation material at least one coating of lead glass having a lead oxide content of at least 60% by weight to produce a composite article, forming a thin silica film on the outer surface of the coated composite article, and heating the article in a reducing atmosphere at a temperature having a known rate of rise to produce a conductive layer on the surface of the article beneath said film, the upper limit of said temperature being about 520° C. and the rate of rise not exceeding a value at which measurable surface conductivity will be imparted to the article at a temperature below about 400° C.

7. The method of fabricating a high resistance conductor which comprises applying to a foundation of insulating material at least one coating of lead glass having a lead oxide content of at least 60% by weight to produce a composite article, and heating said composite article in a reducing atmosphere first at a temperature between about 300° C. and 400° C. until a measurably conductive layer is produced upon the surface of said article and then raising the temperature above about 400° C. but not exceeding about 520° C. to impart further conductivity to said layer.

8. The method of fabricating a high resistance conductor which comprises applying to a foundation of insulating material at least one coating of lead glass having a lead oxide content of at least 60% by weight to produce a composite article, forming a thin silica film on the outer surface of the coated article, and heating the article in a reducing atmosphere first at a temperature between about 300° C. and 400° C. until a measurably conductive layer is produced upon the surface of said article beneath said film and then at a temperature above about 400° C. but not exceeding about 520° C. to impart further conductivity to said layer.

9. The method of fabricating a high resistance conductor which comprises applying upon the surface of an insulating material a first coating of powdered lead glass having a lead oxide content of at least 60% by weight, heating the coated material at a temperature sufficiently high to bond the lead glass to the insulating material, applying to the material thus coated a second coating of said powdered lead glass, heating at a lower temperature which is sufficiently high to sinter said second coating, forming a thin surface film of silica upon said second coating, and thereupon heating the coated material in a reducing atmosphere at a substantially constant temperature selected from the range of about 300° C. to 500° C. for a time correlated with the selected temperature.

10. The method of fabricating a high resistance conductor which comprises applying upon the surface of an insulating material a first coating of powdered lead glass having a lead oxide content of at least 60% by weight, heating the coated material at a temperature sufficiently high to bond the lead glass to the insulating material, applying to the material thus coated a second coating of said powdered lead glass, heating at a lower temperature which is sufficiently high to sinter said second coating, forming a thin surface film of silica upon said second coating, and thereupon heating the coated material in a reducing atmosphere at a rising temperature having a known rate of rise to produce a conductive layer on said second coating beneath said silica film, the upper limit of said last-mentioned temperature being about 520° C. and the rate of rise not exceeding a value at which measurable conductivity will be imparted to said layer at a temperature below about 400° C.

11. The method of fabricating a high resistance conductor which comprises applying upon the surface of an insulating material a first coating of powdered lead glass having a lead oxide content of at least 60% by weight, heating the coated material at a temperature sufficiently high to bond the lead glass to the insulating material, applying to the material thus coated a second coating of said powdered lead glass, heating at a lower temperature which is sufficiently high to sinter said second coating, and thereupon heating the coated material in a reducing atmosphere first at a temperature between about 300° C. and 400° C. until a measurably conductive layer is produced upon the surface of said second coating and then raising the temperature above about 400° C. but not exceeding 520° C. to impart further conductivity to said layer.

12. The method of fabricating a high resistance conductor which comprises applying upon the surface of an insulating material a first coating of powdered lead glass having a lead oxide content of at least 60% by weight, heating the coated material at a temperature sufficiently high to bond the lead glass to the insulating material, applying to the material thus coated a second coating of said powdered lead glass, heating at a lower temperature which is sufficiently high to sinter said second coating, forming a thin surface film of silica upon said second coating, and thereupon heating the coated material in a reducing atmosphere first at a temperature between about 300° C. and 400° C. until a measurably conductive layer is produced upon the surface of said second coating beneath said silica film and then raising the temperature above about 400° C. but not exceeding 520° C. to impart further conductivity to said layer.

13. A high resistance conductor comprising a specimen of lead glass having a lead oxide content of at least 60% by weight, said specimen being superficially freed of lead to form a thin film of silica on the surface thereof, and a thin electrically conductive layer of reduced lead oxide formed on the surface of said specimen beneath said film, said layer having been produced by the method of claim 2.

14. A high resistance conductor comprising the combination of a foundation of insulating material and a coating thereon of glass having a lead oxide content of at least 60% by weight, said coating being superficially freed of lead to form a thin film of silica on the surface thereof and having a thin electrically conductive layer of reduced lead oxide formed beneath said film, said layer having been produced by the method of claim 8.

15. A high resistance conductor comprising the combination of a foundation of borosilicate glass and a plurality of coatings of lead glass thereon having a lead oxide content of at least 60% by weight; the outermost coating being in a sintered, unglazed condition, having a thin film of silica formed on the surface thereof, and containing a reduction product produced by the method of claim 8.

16. A composite article consisting of a foundation of borosilicate glass and successive superimposed coatings on said foundation consisting of lead glass having lead oxide content of 60 to 85% by weight and a thickness of about one-half mil; the first coating adjacent the foundation being glazed and shiny, the second coating superimposed on said first being sintered and unglazed and having a mat appearance, said second coating having a thin film of silica formed on the surface thereof and containing a reduction product beneath said film which has stable ohmic characteristics under high voltage stresses.

KATHARINE B. BLODGETT.

REFERENCES CITED

The following references are of record in the file of this patent:

UNITED STATES PATENTS

| Number | Name | Date |
|---|---|---|
| 344,415 | Shirley | June 29, 1886 |
| 2,025,099 | Gelstharp | Dec. 24, 1935 |
| 2,027,413 | Andres | Jan. 14, 1936 |
| 2,220,862 | Blodgett | Nov. 5, 1940 |
| 2,251,144 | Lytle | July 29, 1941 |
| 2,314,804 | Willson | Mar. 23, 1943 |
| 2,339,928 | Hood | Jan. 25, 1944 |
| 2,369,741 | Jones et al. | Feb. 20, 1945 |
| 2,457,678 | Jira | Dec. 28, 1948 |